United States Patent [19]

Wu

[11] 4,365,563

[45] Dec. 28, 1982

[54] SAFETY DEVICE FOR A BURNER OF A COAL GASIFICATION PLANT

[75] Inventor: Hsi L. Wu, Amsterdam, Netherlands

[73] Assignee: Shell Oil Co., Houston, Tex.

[21] Appl. No.: 259,888

[22] Filed: May 4, 1981

[30] Foreign Application Priority Data

May 29, 1980 [NL] Netherlands ........................ 8003093

[51] Int. Cl.[3] ................................................ F23N 5/18

[52] U.S. Cl. .................................... 110/186; 110/263; 137/240; 137/625.18; 137/625.19; 239/119

[58] Field of Search ............... 110/185, 186, 263, 347; 239/112, 119, 288.5, 436; 222/148; 137/240, 311, 625.18, 625.19; 251/207, 208

[56] References Cited

U.S. PATENT DOCUMENTS

| | | | |
|---|---|---|---|
| 3,528,611 | 9/1970 | Watson | 239/119 |
| 3,593,920 | 7/1971 | Watson | 239/119 |
| 4,116,386 | 9/1978 | Calder | 239/119 |

*Primary Examiner*—Edward G. Favors
*Assistant Examiner*—Steven E. Warner

[57] ABSTRACT

A safety device for protecting a burner of a coal gasification plant against solid blockage. Solid blockage may occur in a burner of a coal gasification plant fed with a mixture of coal particles and fluid. In order to protect the burner against solid blockage a safety device is proposed which is arranged in the supply line to the burner. By means of this safety device relatively large pieces of solid material, which might cause blockage of the burner, can be eliminated from the mixture of coal particles and fluid supplied to the burner.

5 Claims, 7 Drawing Figures

FIG.6
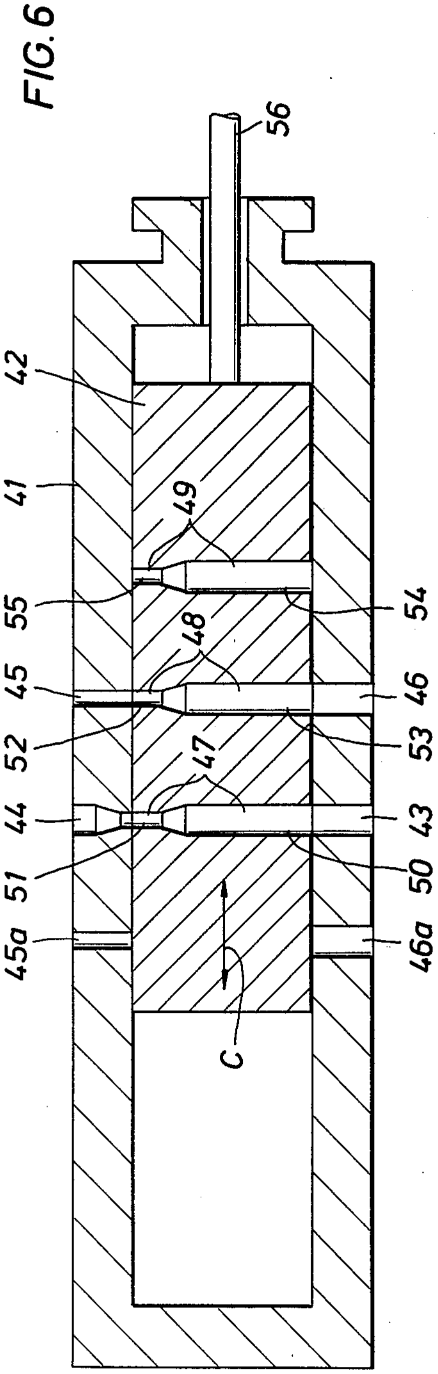
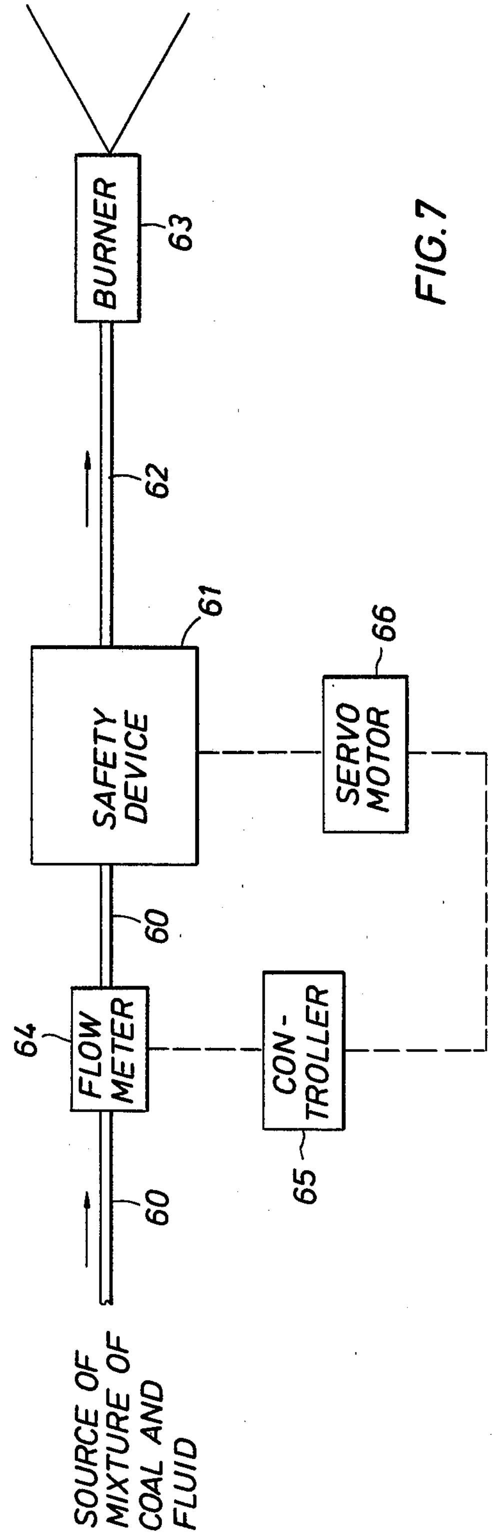
FIG.7

SAFETY DEVICE FOR A BURNER OF A COAL GASIFICATION PLANT

BACKGROUND OF THE INVENTION

The invention relates to a safety device for protecting against blocking the flow into a burner of a coal gasification plant in which the burner is being fed with a mixture of coal particles and fluid.

It is known to gasify coal by partial combustion of coal in the presence of oxygen or air. In said process a mixture of coal particles and fluid is fed through a supply line to a burner of a coal gasification plant in which coal is partially combusted.

The mixture of coal particles and fluid sometimes contains foreign solid particles having larger dimensions than those of the coal particles and than those of the passages of the burner. Such foreign particles may comprise materials having a specific weight lower than that of the coal particles, such as non-ferro particles, textile particles, plastic particles, etc., and having dimensions such that on the one hand they can flow through the supply line to the burner, but on the other hand they can block passages of the burner. Blockage of a burner (for a significantly long time) causes serious disruptions of the coal gasification process and often necessitates a disassembly of the blocked burner.

The object of the invention is to provide a safety device by means of which it is possible to prevent a disruptive blockage of a burner of a coal gasification plant by said foreign particles.

SUMMARY OF THE INVENTION

The present invention relates to a safety device which includes a housing within which there is a movable element. The housing contains coal fluid inlet and outlet ports for flows of a mixture of coal particles and fluid and cleaning fluid inlet and outlet ports for flows of blockage-removing fluid. The movable element within the housing contains at least two internal channels which each have a relatively narrow and a relatively wide portion. The arrangement of the inlet and outlet ports and the internal channels is such that the movable element can be positioned within the housing so that (a) in a first position, one internal channel forms a flow path between the coal fluid inlet and outlet ports with the wide portion of that internal channel upstream of the narrow portion while another internal channel forms a flow path between the cleaning fluid inlet and outlet ports with the wide portion of that channel downstream of the narrow portion and (b) in a second position, one internal channel which was previously connected between the coal fluid ports with its wide portion upstream is now connected between the cleaning fluid ports with its wide portion downstream. In one embodiment of the invention the movable element is rotatably movable within the housing. In another embodiment, the movable element is linearly movable within the housing.

DESCRIPTION OF THE DRAWINGS

FIG. 6 shows a cross-section of the embodiment according to FIG. 4, wherein the movable element is in a third position.

FIG. 7 shows a scheme of the location of the safety device according to the invention in a supply line for feeding a mixture of coal particles and fluid to the burner of a coal gasification plant.

DESCRIPTION OF THE INVENTION

Figure 1:
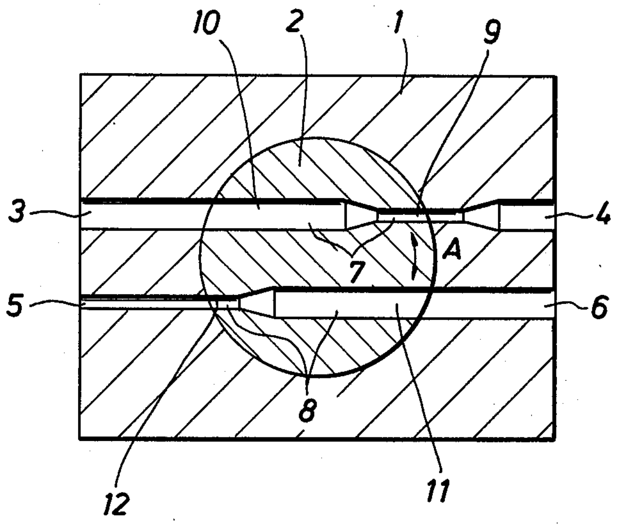
FIG. 1 shows a cross-section of a first embodiment of the safety device according to the invention, provided with a rotatably arranged movable element.

In the embodiment according to FIG. 1 a movable cylindrical element 2 is so arranged in a housing 1 that the element 2 is rotatable around its central longitudinal axis, as indicated by arrow A. The housing 1 is provided with an inlet 3 and an outlet 4 for the mixture of coal particles and fluid. The housing 1 is also provided with an inlet 5 and an outlet 6 for a fluid for removing blockages. In the rotatable element 2 two channels 7 and 8 are present. In the shown position of the element 2 the channel 7 connects the inlet 3 to the outlet 4 in such a manner that in the direction from inlet 3 to the outlet 4, a narrow part 9 of the channel 7 is located after (or downstream from) a wide part 10 of the channel 7. In the same position of the element 2, the channel 8 connects the inlet 5 to outlet 6 in such a manner that in the direction from inlet 5 to outlet 6 a wide part 11 of the channel 8 is located after a narrow part 12 of the channel 8.

Figure 2:
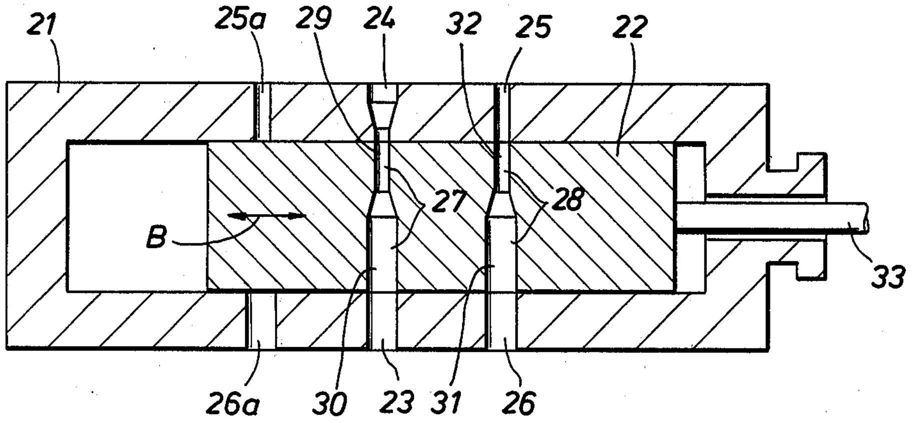
FIG. 2 shows a cross-section of a second embodiment of the safety device according to the invention, provided with a movable element arranged in a linearly displaceable manner.
Figure 3:
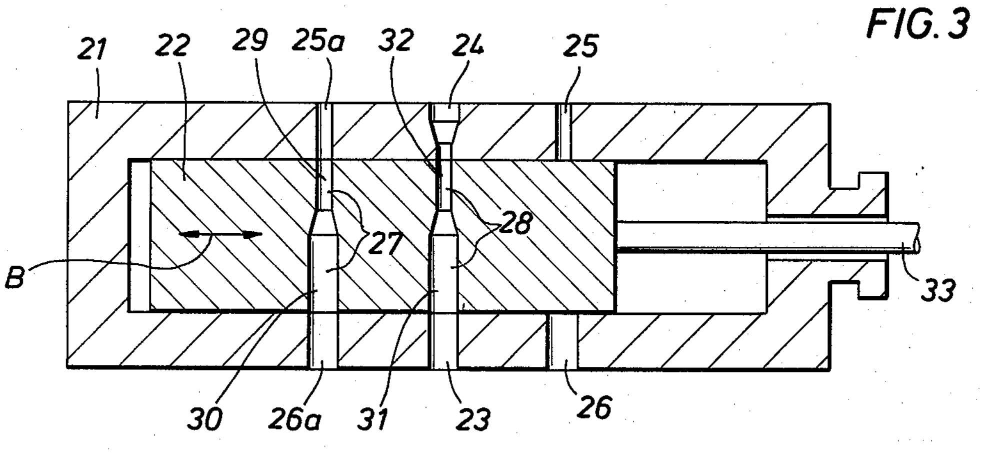
FIG. 3 shows a cross-section of the embodiment according to FIG. 2, wherein the movable element is in another position than in FIG. 2.

In the embodiment according to FIGS. 2 and 3, a movable element 22 is so arranged in a housing 21 that the element 22 is linearly displaceable in the direction of its longitudinal axis, as indicated by arrow B. The housing 21 is provided with an inlet 23 and an outlet 24 for the mixture of coal particles and fluid. The housing 21 is also provided with a double set of inlets 25 and 25(*a*) and outlets 26 and 26(*a*) for a fluid removing blockages. In the movable element 22 two channels 27 and 28 are present.

In the position of the movable element 22 as shown in FIG. 2, channel 27 connects inlet 23 to outlet 24 in such a way that, in the direction from inlet 23 to outlet 24, a narrow part 29 of channel 27 is located after a wide part 30 of channel 27. In the same position of element 22, channel 28 connects inlet 25 to outlet 26 in such a way that, in the direction from inlet 25 to outlet 26, a wide part 31 of channel 28 is located after a narrow part 32 of channel 28.

In the position of the movable element 22 as shown in FIG. 3, the channel 28 connects the inlet 23 to the outlet 24 and the channel 27 connects the inlet 25(*a*) to the outlet 26(*a*). In the direction from inlet 23 to outlet 24, the narrow part 32 of the channel 28 is located after the wide part 31 of the channel 28 and, in the direction from inlet 25(*a*) to outlet 26(*a*), the wide part 30 of the channel 27 is located after the narrow part 29 of the channel 27. To enable the movable element 22 to be displaced to the desired positions, one end of the element 22 is provided with a driving rod 33 passing through the wall of the housing 21.

Figure 4:
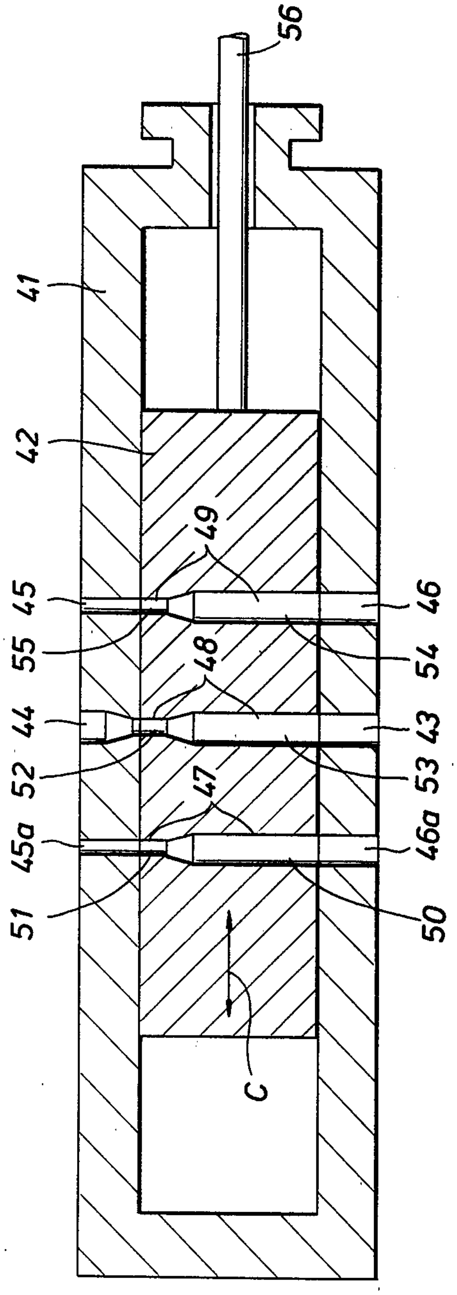
FIG. 4 shows a cross-section of a third embodiment of the safety device according to the invention, likewise provided with a movable element arranged in a linearly displaceable manner, wherein the movable element is in a first position.
Figure 5:
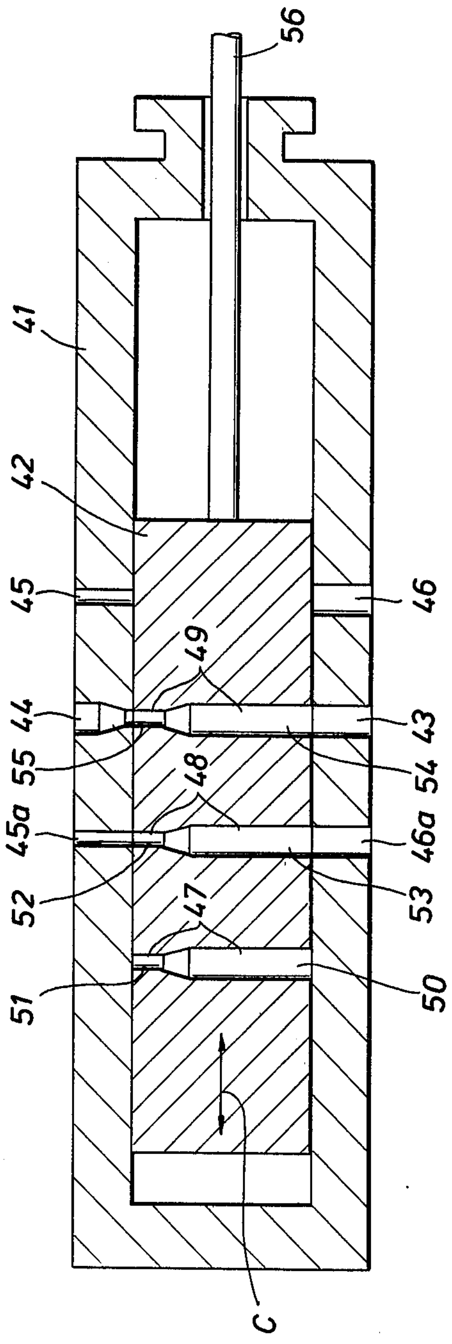
FIG. 5 shows a cross-section of the embodiment according to FIG. 4, wherein the movable element is in a second position.

In the embodiment according to FIGS. 4, 5 and 6, a movable element 42 is so arranged in a housing 41 that the element 42 is linearly displaceable in the direction of its longitudinal axis, as indicated by arrow C. The housing 41 is provided with an inlet 43 and an outlet 44 for the mixture of coal particles and fluid. The housing 41 is also provided with a double set of inlets 45 and 45(*a*) and outlets 46 and 46(*a*) for a fluid for removing blockages. The movable element 42 is provided with three channels 47, 48 and 49.

In the position of the movable element 42 as shown in FIG. 4 the channel 47 connects the inlet 45(*a*) to the outlet 46(*a*) in such a way that, in the direction from inlet 45(*a*) to outlet 46(*a*), a wide part 50 of channel 47 is located after a narrow part 51 of channel 47. In the same position of the element 42 the channel 48 connects the inlet 43 to the outlet 44 and the channel 49 connects the inlet 45 to the outlet 46. In the direction from inlet 43 to outlet 44, a narrow part 52 of channel 48 is located after a wide part 53 of channel 48 and, in the direction from inlet 45 to outlet 46, a wide part 54 of channel 49 is located after a narrow part 55 of channel 49.

In the position of the movable element 42 as shown in FIG. 5, channel 49 has taken the place of channel 48 and channel 48 has taken the place of channel 47. In this position of element 42 channel 47 is out of operation.

In the position of movable element 42 as shown in FIG. 6, channel 47 has taken the place of channel 48 and channel 48 has taken the place of channel 49. In this position of the element 42 channel 49 is out of operation.

To enable the movable element 42 to be displaced to the desired positions, one end of element 42 is provided with a driving rod 56 passing through the wall of the housing 41.

The use of the safety device according to the invention will now be described with reference to FIG. 7.

In FIG. 7, reference numeral 60 indicates a line for feeding the mixture of coal particles and fluid to a safety device 61 of the kind as described hereinbefore. From the safety device 61 extends a line 62 for the mixture of coal particles and fluid to a burner 63 of a coal gasification plant (not shown). A flow meter 64 is arranged in the line 60 for determining the flow rate of the mixture of coal particles and fluid in the line 60. This flow meter 64 is connected to a controller 65 that is concerned in turn to a servomotor 66 which is capable of adjusting the movable element of the safety device.

The operation of the system according to FIG. 7 is as follows: Assume that the safety device 61 used is the embodiment according to FIG. 1. The line 60 is then connected to the inlet 3 and the line 62 to the outlet 4. If there are no coarse particles in the mixture of coal particles and fluid, the mixture will freely flow to the burner 63 through line 60, channel 7 and line 62. If coarse particles are present in said mixture, they will completely or partly block the narrow part 9 of the channel 7, with the result that the flow meter 64 indicates a fall in the passing quantity of mixture. The flow meter 64 then issues a signal to the controller 65 which compares the signal with a predetermined desired value. If the value measured is lower than the desired value, a signal is passed to the servomotor 66, which adjusts the movable element 2 of the safety device 61 in such a way that channels 7 and 8 interchange places. Since the clean, i.e., the non-blocked, channel 8 now forms the connection between inlet 3 and outlet 4, the mixture of coal particles and fluid can again freely flow to the burner 63. The blocked channel 7, which now forms the connection between inlet 5 and outlet 6, can now be blown out. Inlet 5 is connected to a line (not shown) supplying pressurized fluid that can remove the blockage from the narrow part 9 and entrain it in fluid flowing through the wide part 10 and out through the outlet 6. When a blockage occurs in the channel 8, which is now located between inlet 3 and outlet 4, the above-mentioned process is repeated, i.e., the channels 7 and 8 again interchange places.

If the safety device 61 used is the embodiment according to FIGS. 2 and 3, the line 60 is connected to the inlet 23 and the line 62 is connected to the outlet 24. The mixture of coal particles and fluid then flows to the burner 62 through line 60, channel 27 and line 62 (see FIG. 2). As soon as a blockage occurs in the narrow part 29 of the channel 27, the element 22 is displaced to the position as shown in FIG. 3 by the servomotor 66. The clean, non-blocked channel 28 then takes the place of the blocked channel 27 and the channel 27 is then located between the inlet 25(*a*) and the outlet 26(*a*). In this position of the element 22, the mixture of coal particles and fluid can freely flow to the burner 63, namely through line 60, channel 28 and line 62. Since inlet 25(*a*) is connected to a line (not shown) supplying pressurized fluid, the blockage in the narrow part 29 of channel 27 will be entrained by the fluid and be discharged through the wide part 30 and the outlet 26(*a*). In the event of the next blockage, now in channel 28, the element 22 is returned to the position according to FIG. 2 by servomotor 66. The blown-out channel 27 is then again between inlet 23 and outlet 24, so that the mixture of coal particles and fluid can again freely flow to the burner 63, and the blocked channel 28 is then located between the inlet 25 and the outlet 26. Since the inlet 25 is also connected to a line (not shown) supplying pressurized fluid, the blockage in the narrow part 32 of channel 28 is entrained by the fluid and removed through the wide part 31 and the outlet 26. When the next blockage occurs, now again in channel 27, element 22 is returned to the position according to FIG. 3 by servomotor 66, after which the whole process is repeated.

If the safety device 61 used is the embodiment according to FIGS. 4, 5 and 6, line 60 is connected to the inlet 43 and line 62 is connected to the outlet 44. The mixture of coal particles and fluid then flows to the burner 63 through line 60, channel 48 and line 62 (see FIG. 4). As soon as a blockage occurs in the narrow part 52 of the channel 48, the servomotor 66 displaces the movable element 42 either to the position according to FIG. 5 or to that according to FIG. 6. In the first case the non-blocked channel 49 takes the place of channel 48 and in the second case the non-blocked channel 47 takes the place of channel 48. In both cases the mixture of coal particles and fluid can again freely flow to the burner. Since both the inlet 45 and the inlet 45(*a*) are connected to a line supplying pressurized fluid, channel 48 will be blown out, both in the position according to FIG. 5 and in the position according to FIG. 6. When the next blockage occurs, now in channel 49 or in channel 47, the element 42 can be returned to the position according to FIG. 4, after which the whole process is repeated.

The advantage of the embodiment according to FIGS. 4, 5 and 6 is that a spare channel is present in element 42, which can be useful if a channel were to become so blocked that removal of the blockage would not be possible without disassembly of the safety device.

The diameters of the narrow parts 9, 12, 29, 32, 51, 52 and 55 of the respective channels 7, 8, 27, 28, 47, 48 and 49 are smaller than the diameters of the burner passages, so that it is ensured that the safety device will not allow the passage of particles that could block the burner passages.

The fluid used in the mixture of coal particles and fluid is, for example, a gas such as nitrogen ($N_2$), synthesis gas ($CO+H_2$) or steam. The fluid used in the mixture of coal particles and fluid, however, can also be a liquid, for example oil, water or a mixture of water and oil.

The fluid used for blowing out the internal channels in the movable element is, for example, air or nitrogen. A source of fluid under a pressure sufficient to provide a surge of flow, at a rate sufficient to dislodge channel-plugging particles, through a valve means responsive to the shifting of the internal channels within the movable element of the present safety device is preferably arranged for blowing out those internal channels. Such an arrangement can be provided for example, by means of known devices and techniques. Such an arrangement can provide a prompt initiation of the particle-removing surge of flow, through the cleaning fluid inlet and outlet ports of the housing, substantially as soon as an internal channel has been connected between those ports.

The very short interruption of the feed of the mixture of coal particles and fluid to a burner in the operation of the safety device appertaining to the relevant burner has no adverse effect on the coal gasification process, since coal gasification plants are normally equipped with several burners. According to the invention each burner is provided with an appertaining safety device as described in the above.

What is claimed is:

1. A safety device for preventing blockages of significant duration in the flowing of a mixture of coal particles and fluid through the safety device and into a burner, comprising:

a housing which contains a movable element inside its wall;

in the wall of the housing, coal fluid inlet and outlet ports for flowing a mixture of coal particles and fluid into and out of the housing, and cleaning fluid inlet and outlet ports for flowing a blockage-removing fluid into and out of the housing;

within the movable element inside the housing, at least two internal channels, with each internal channel having both a narrow portion and a wide portion; and, an arrangement of said coal fluid and cleaning fluid ports and said internal channels such that the movable element can be moved into (a) a first position in which one internal channel forms a flow path between the coal fluid inlet and outlet ports, with the wide portion of that internal channel upstream of the narrow portion, while another internal channel forms a flow path between the cleaning fluid inlet and outlet ports, with the wide portion of that channel downstream of the narrow portion, and (b) a second position in which one internal channel that was previously connected between the coal fluid ports with its wide portion upstream is now connected between the cleaning fluid ports with its wide portion downstream.

2. The safety device of claim 1 in which the narrow portion of each internal channel is at least as narrow as the narrowest channel which is located between the safety device and the burner which is protected by the safety device.

3. The safety device of claim 1 or 2 in which the movable element is rotatably movable within the housing.

4. The safety device of claim 1 or 2 in which the movable element is linearly movable within the housing.

5. The safety device of claim 1 or 2 in which the movable element is linearly movable within the housing and is provided with three internal channels.

* * * * *